July 3, 1962
A. M. SCHWARTZ
3,042,245
RIVET PULL GUN
Filed Feb. 20, 1961
2 Sheets-Sheet 2
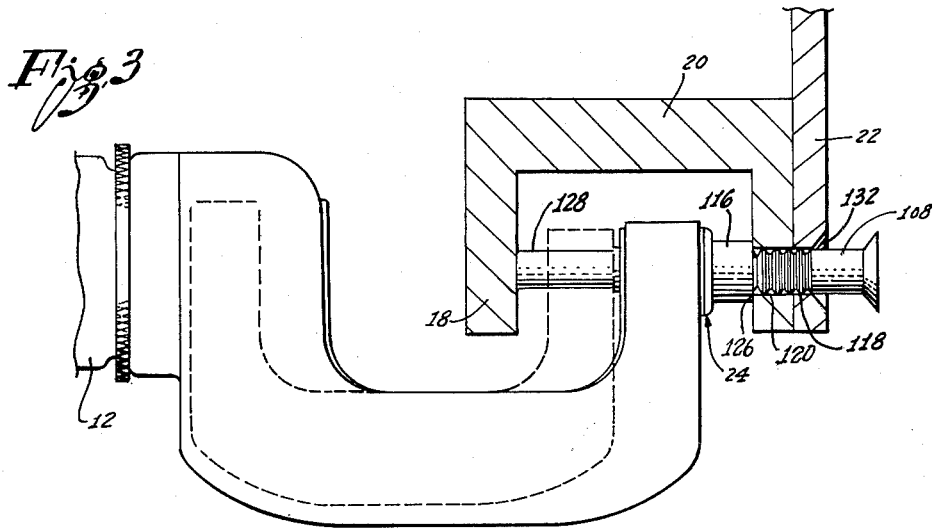
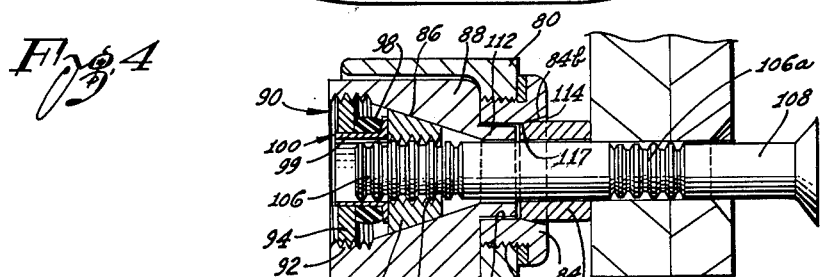
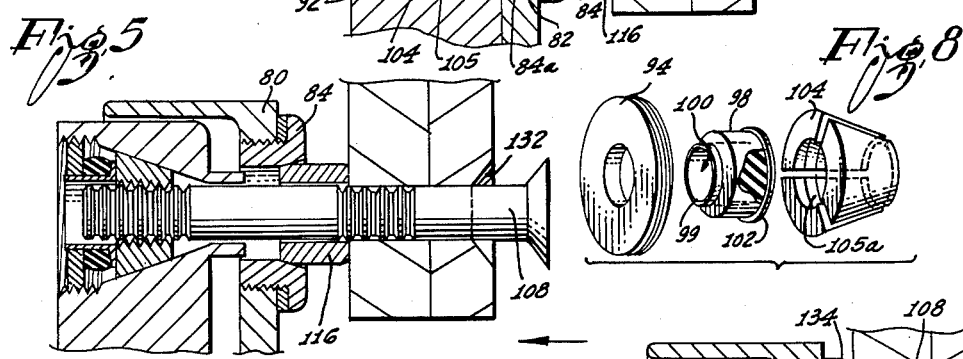
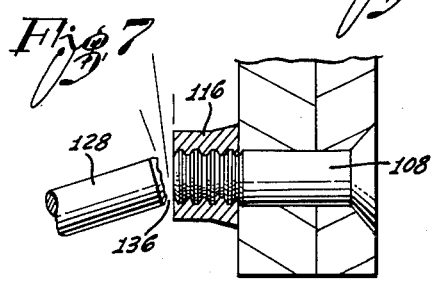
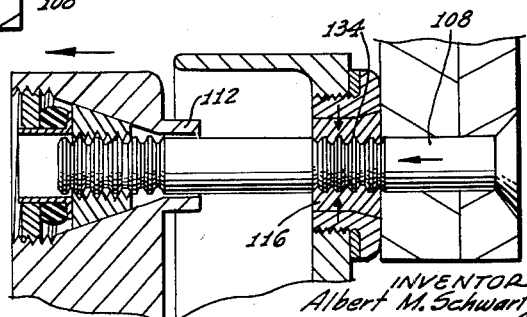
INVENTOR:
Albert M. Schwartz
Attorneys United States Patent Office 3,042,245
Patented July 3, 1962

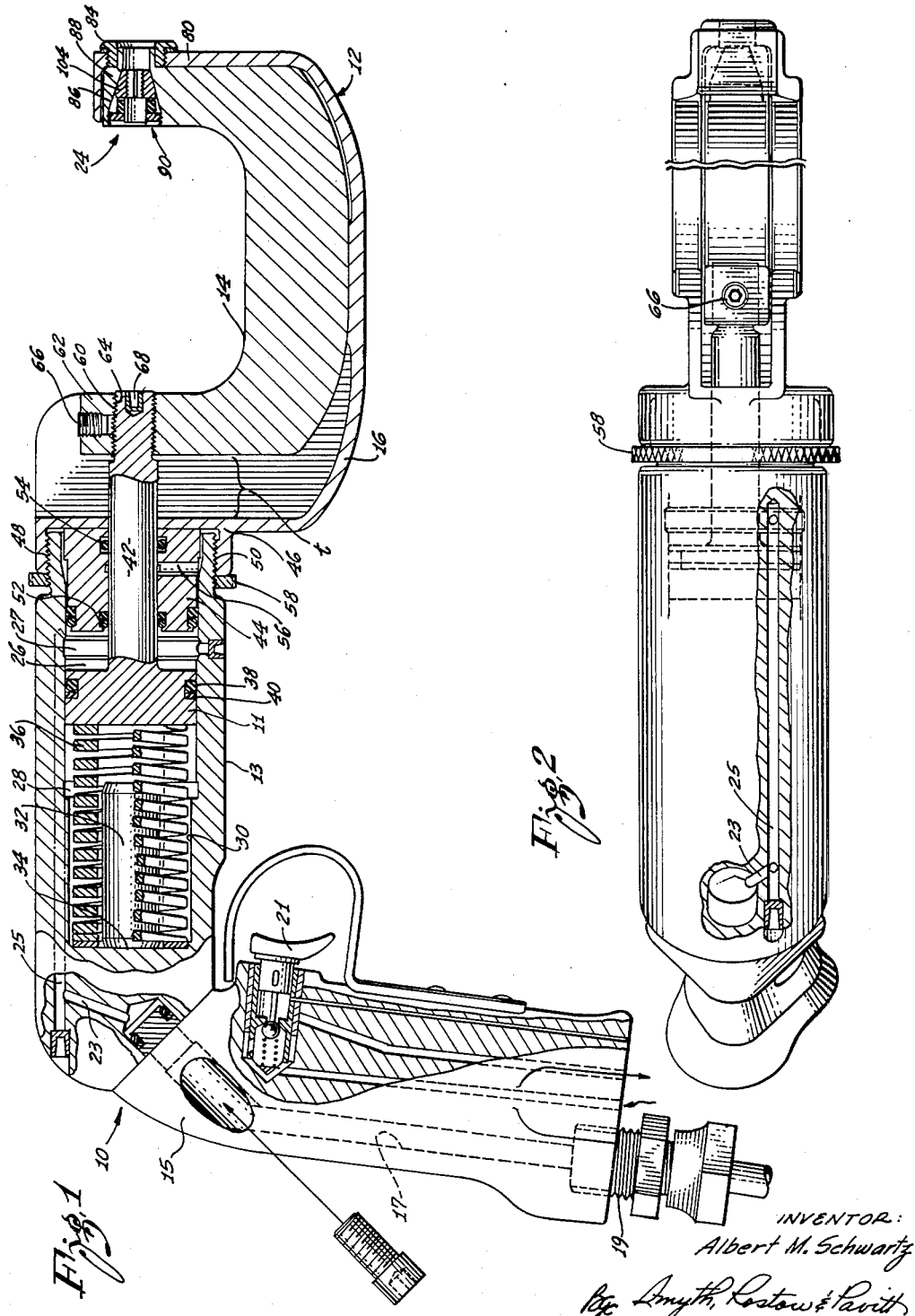

3,042,245
RIVET PULL GUN
Albert M. Schwartz, Palos Verdes Estates, Calif., assignor to Brown-Line Corporation, El Segundo, Calif., a corporation of California
Filed Feb. 20, 1961, Ser. No. 90,308
8 Claims. (Cl. 218—42)

This invention relates to obstacle circumventing tools, and in particular, to an improved rivet setting mechanism which is adapted to set rivets or lock-bolts of the type disclosed in expired U.S. Patent No. 2,061,628 issued to L. C. Huck, in confined areas where conventional rivet pull guns, such as are disclosed in expired U.S. Patents, Nos. 2,132,112 and 2,132,113, also issued to L. C. Huck, cannot be employed because of obstructions preventing the proper approach of such conventional guns to the rivets or lock-bolts.

While the two-part fastener, of the type which has been the subject of a number of patents issued to L. C. Huck, e.g. 2,061,628, 2,114,493, 2,132,112, 2,132,113, 2,397,111, 2,531,048, 2,531,049, 2,527,307, 2,754,703, has been widely employed to secure in abutment pluralities of elements having plate-like surfaces, it has heretofore been found impossible to employ such fasteners in certain applications where the setting of the fasteners must be approached from one side of one of the two elements to be secured together, and such side includes structure which prevents a rivet gun from being brought in normally thereto to set the fastener in the conventional manner.

A particular situation in which this impossibility is encountered, occurs when an aircraft wing panel is to be reinforced from within by a channel member having a C-shaped cross section and attached with lock-bolts as shown on U.S. Patent 2,531,048. Since the outside of the panel must be smooth for aerodynamic efficiency, the fastener employed must be of the flush-head type and countersunk into such panel. It may not, therefore, be inserted from the inside of the panel through the channel member and wing skin member and set from the outside, since this would result in the swaged extremity of the fastener projecting outwardly from the panel skin. Prior to the present invention, no tool has been available to set such a fastener from inside the panel and through one side of the channel member. The only prior known way the channel member and panel could be thus secured by lock-bolts has been to bore the obstructing side of the channel member sufficiently to permit the end of a conventional rivet pull gun to be passed through such side sufficiently to set the rivet through the other side of the channel member and the panel. Such boring, however, greatly weakens the C-channel member. Aircraft manufacturers, therefore, have been forced to secure such reinforcing members to the wing panel by means of bolts and nuts, thereby increasing the weight of the aircraft beyond what it would be if lock-bolts, hi-shear or blind rivet type fasteners could be practically employed.

The present invention enables reinforcing channel members of such cross sectional configuration to be secured by such rivets or lock-bolts without the necessity of boring through the C-channel member and weakening the same. The invention is adaptable to providing means for setting such rivets or other fasteners behind a number of different forms of obstacles which would bar use of the conventional straight axis rivet gun.

The invention provides for the construction of a tool having an element which performs a function by a movement in relation to a member, direct access to which member in the direction of the required movement is prevented by the presence of an obstacle spaced from the member. As applied to a device for setting a rivet or lock-bolt type fastener, the invention contemplates the construction of a tool having a mechanism to secure a fastener, the longitudinal cross section of which mechanism is of a configuration adapted to circumvent the obstacle which prevents use of a tool requiring an approach along the axis of the fastener.

In the preferred embodiment of the invention herein illustrated and described, which is adapted to set rivets and lock-bolts, the tool includes an inner and outer yoke assembly, the outer of which yokes is fixedly secured, as a reaction member, to the cylinder of the rivet-setting gun and includes an orificed swaging anvil. The other yoke is slideable relative to the first yoke for a distance and in the direction required to effect the rivet or lock-bolt setting, and includes a pin-gripping chuck and swaging unit. The requisite movement of the slidable yoke is accomplished by a hydraulic actuating mechanism. Thus, a hydraulically actuated piston, reciprocable in the barrel, is provided with a rod or extension which is secured to the inner yoke to reciprocate the inner yoke within the outer yoke. The yokes in this embodiment are U-shaped in longitudinal cross section to enable the co-operating extremities of the two yokes to by-pass one side of a C-shaped reinforcing member.

The invention is hereinafter explained in more detail in reference to the accompanying drawings in which:

FIG. 1 is a side elevation partly in section of the preferred embodiment of the invention;

FIG. 2 is a plan view of the hydraulic cylinder and yoke assembly of the FIG. 1 embodiment;

FIG. 3 is a sectional view of two structural members which are to be joined by a lock-bolt, showing the manner in which the yokes of the preferred embodiment of the invention are adapted to circumvent the outer flange of a C-channel reinforcing member;

FIG. 4 is an enlarged sectional view of the pin gripping portion of the inner yoke and the cooperating outer yoke structure, illustrating the manner in which these elements are employed to secure a two-part fastener through a pair of plates;

FIGS. 5, 6 and 7 are views similar to FIG. 4 showing succeeding steps in the use of the preferred embodiment of the invention; and FIG. 8 is an exploded view of the pin gripping chuck which is carried by the inner yoke.

The preferred embodiment of the invention shown in FIGS. 1 and 2 comprises a hydraulic gun 10 operatively carrying a U-shaped yoke assembly 12 which includes an inner yoke 14, slideable, axially, relative to an outer yoke 16. The U-shaped configuration has been chosen to enable the yoke assembly 12 to circumvent the obstructing flange 18 of a C-channel member 20 which is to be secured by a lock-bolt 108 to a panel 22 as best shown in FIG. 3. The actual lock-bolt-setting portions 24 of the tool are carried on the forward extremities of the yoke assembly.

A hydraulically actuated piston 11 is disposed to reciprocate within a cylindrical barrel 13 mounted on the gun handle 15. The gun handle 15 is bored to provide a duct 17 extending through the handle to a coupling fixture 19. Duct 17 is connected to a source (not shown) of oil or other hydraulic fluid under pressure, the admission of which into duct 17 is effected by depressing the trigger 21 in any of the arrangements well-known to the art. The hydraulic handle structure per se forms no part of the present invention.

Fluid under pressure arriving via the duct 17 is conducted by the passages 23 and 25 peripherally within the barrel wall 13 to the cylindrical chamber 26 where it is discharged via the annular chanel 27 forward of the piston 11, to actuate the latter. The cylindrical chamber 26 extends axially within the barrel 13 to the coaxial annular groove 28, which, in turn, communicates with a coaxial counterbore extension 30. A cylindrical piston stop member 32 is disposed coaxially in the counterbore 30 to abut the end wall 34. A coil spring 36 surrounds the stop member 32 and extends, when uncompressed, into the cylindrical chamber 26 to urge the piston 11 toward the outer extremity of the latter chamber.

The piston 11 is provided with an annular sealing element 38 and a back-up ring 40 in a manner well-known in the hydraulic art.

Integrally formed with the piston is a coaxial rodlike element 42 which extends through a cylindrical closure plug 44. The latter is affixed in the open end of the barrel 13 to close the same, and forms the forward end closure wall for the cylindrical chamber 26. The plug 44 is secured in the right-hand extremity of the barrel 13 by the outer yoke base 46, which is annularly flanged at 48 and threadingly engaged with a mating screw thread 50 provided peripherally on the extremity of the barrel 13. Seals 52 and 54, with the intermediate vent passage 56, prevent leakage of the fluid from the chamber 26 axially along the element 42. A threaded washer 58 limits the extent to which the flange 48 may be screwed onto the thread 50, in order that the yoke 46 may be properly oriented in any desired attitude about the barrel axis.

The rodlike element 42 is further threaded at its extremity 60 to enable the trailing arm 62 of the inner yoke 14, which is bored at 64 and matingly threaded, to be screwed onto the extremity 60 to a point where the inner yoke 14 is co-aligned with the outer yoke 16. Set screws 66 and 68 serve to lock the inner yoke 62 against rotation about the axis of the element 42.

The overall dimensions and configuration of the inner yoke 14 relative to the outer yoke 16 are such as to provide axially between them a travel space $t$, within which the inner yoke may be axially reciprocated.

The distance $t$ is determined by reference to the optimum relative movement between the cooperating elements carried by the extremities of the two yokes, to effect the pulling of the rivet or lock-bolt and the swaging of the collar thereon.

The forward or right-hand extremity 80 of the outer yoke 16 is orificed at 82 to receive a swaging anvil 84 of the rivet-setting mechanism. The axis of the bore 82 preferably coincides with the axis of the element 42, although this is not essential to the practice of the present invention. The anvil 84 is an annularly shaped element and defines a passage comprising a cylindrically shaped portion 84a and a frusto-conical shaped portion 84b.

Coaxial with the bore 82 in the outer yoke extremity 80 is a frusto-conical bore 86 in the extremity 88 of the inner yoke 14. This frusto-conical bore 86 receives the collet gripping assembly designated generally by the numeral 90, and is best shown in FIGS. 4, 5, 6 and 8. A cylindrical counterbore 92 extends from the left-hand wall surface of the extremity 88 coaxially into said extremity 88 to intersect the frusto-conical bore 86. The counterbore 92 is threaded to receive a matingly threaded washer element 94. The collet gripping assembly 90 comprises: (a) a radially segmented axially orificed frusto-conical chuck 104 which is insertable within the conical bore 86. This chuck 104, when its segments are brought together radially, defines a coaxial orifice 105, and is internally grooved at 105a; (b) a coaxial jamb follower 100 formed of a sleeve 99 and an integral radiating flange 102 which abuts the base of the chuck segments 104 and serves as a pressure plate; (c) a resilient tube 98 disposed over the sleeve 99 and with one end abutting the flange 102; and (d) the washer element 94. The outside diameter of the sleeve 99 is slightly smaller than the inside diameter of the washer 94 so as to be slideable axially within and relative to the washer 94. By threading the washer 94 into the bore 92, the resilient tube 98 may be placed under compression, thereby to urge the jamb follower 100 against the bases of the chuck segments. The chuck segments 104, when pressed as far as possible into the frusto-conical bore 86 will be found to close upon and engage the gripping portion 106 of a pin 108 inserted into the assembly 90.

The leading or right-hand face of the yoke extremity 88 is provided with an annular projecting flange 112, the outside diameter of which is such as to enable this flange to be slideably insertable within the cylindrical portion 84a of the passage defined by the annular anvil 84. The frusto-conical portion 84b of the anvil 84, serves to receive a malleable collar 116 which is to be swaged about another gripping portion 106a of the pin 108 in the manner hereinafter explained.

In use, the gun handle 15 is connected appropriately to a suitable source of hydraulic fluid under pressure. A headed pin 108 of a two-part fastener is inserted from the right-hand side of the plate 22 (FIG. 3) through holes 118 and 120, drilled or punched respectively in the panel 22 and in its channel reinforcing member 20; and a malleable collar 116 is slipped over the protruding extremity 128 of the pin 108 and pressed thereon until it abuts the inner face 126 of the channel reinforcing member 20. The protruding end 128 of the pin 108 is passed through the chuck gripping assembly 90 until the frusto-conical passage defining surface 114 portion of the swaging anvil 84 abuts the outer chamfered surface 117 of the malleable collar 116. With the chuck 104 pressed into the bore 86 through the urging of the resilient tube 98 against the radiating flange member 102 of the jamb follower 100, the grooves 105a of the chuck 104 engage the matingly grooved gripping portion 106 of the pin 108.

It will be observed that the configuration of the yokes permits the chuck and anvil assembly to be passed over the pin extremity 128, and by circumventing the protruding flange 18 of the reinforcing member 20 allows the barrel 13 of the gun to be coaxially aligned with the pin 108 for maximum effective reaction in the use of the rivet or lock-bolt setting mechanism.

When the trigger 21 of the gun is squeezed, the hydraulic fluid, under pressure, flows through the ducts 17, 23 and 25 to enter the chamber 26 forward of the piston 11, thereby urging the latter rearwardly, or to the left, in the barrel 13 to overcome the force exerted by the coil spring 36. As it moves, the piston 11 draws the inner yoke 14 to the left by the distance $t$.

The effect of this movement of the yoke may be seen in the sequential steps illustrated in FIGS. 4–7, inclusive. On one hand, the headed pin 108 is pulled to the left until the pin head seats firmly in the countersunk bore 132 in the panel 22 and is placed under tension. Simultaneously, the malleable collar 116 is reactively forced through the anvil 84 and thereby swaged by the anvil about the ribs 134 of the grooved gripping portion 106a of the pin. At this time the pin breaks or is caused to break flush with the top of swaged collar 116 at break 136 with release of the trigger 21 and consequent return of inner yoke 14 to its original position. Such return results in the axially protruding flange 112 striking the left-hand end (or top) of the swaged collar 116, thereby to place the pin under further pull tension so as to break the same at break 136, if such breaking has not previously occurred.

It will readily be appreciated by those skilled in the art that a tool, constructed in accordance with the present invention, may be provided with yokes formed in many different configurations to circumvent various obstacles which preclude use of a conventional rivet setting mechanism, such as is disclosed in expired United States Patents 2,132,112 and 2,132,113, without departing from the invention. All such different embodiments are intended to be comprehended within the scope of the present invention.

I claim:

1. A tool having a pair of cooperating elongated adjacently disposed elements adapted to perform an operation at a point on a member, one of which elements functions by having a portion drawn away from a portion of the other element, said tool being adapted to effect such drawing movement of said one portion from the other portion despite the presence of an obstruction spaced from a member and extending past a line normal to the member from said point on said member, but leaving access to said point from one side thereof, said tool comprising: a first yoke, said yoke comprising a first elongated element having a longitudinal cross-section such as to extend from said point, in circumvention of said obstruction to a location beyond said obstruction; a second yoke, said second yoke including a second elongated element similar in configuration to said first yoke and disposed adjacent the latter, said second element being slideable relative to the first element within the space between the member and the obstruction and upon such sliding movement, a portion of the second element is drawn away from a portion of the first element, and the first element carrying the said second element; and means disposable beyond said obstruction, said means having a fixed portion secured to the first element, and a reciprocable portion connected to the second element, whereby upon actuation of said reciprocable portion of said means, the second element to which the reciprocable portion is connected is caused to slide relative to the first element thereby drawing away the said portion of the second element from said portion of the first other element cooperating therewith.

2. A device adapted to set a two-piece fastener, comprising a grooved pin and a malleable collar to be swaged in the grooving on said pin, in a hole in a member behind an obstruction, said obstruction being spaced from the member and extending past the outwardly projected axis of the hole, so as to prevent a straight axis fastener setting tool from being brought into axial alignment with said pin in said hole, said device comprising: an outer yoke, said yoke being elongated and having a longitudinal cross-section of a configuration such as to extend from the said hole around the obstruction to a point outside thereof; an inner yoke of similar longitudinal cross-section, said inner yoke fitting inside the outer yoke and being slideable for a predetermined distance longitudinally relative to said outer yoke; first means for holding said outer yoke in circumvention of said obstruction and with one yoke extremity in abutment with said holed member, said means being fixedly secured to said outer yoke remotely from the last said extremity; second means reciprocable relative to said first means in the direction of the projected axis of the hole, said second means being fixedly secured to the inner yoke and adapted to dispose the terminal portion of said inner yoke adjacent the outer yoke extremity; and power means adapted, upon actuation, to slide said second means relative to the first means, thereby to draw said inner yoke terminal portion away from said outer yoke extremity and said holed member; said outer yoke being orificed at its said abutting extremity, and a swaging anvil being inserted in said orifice; and said inner yoke including at its terminal portion adjacent said anvil and in register with the anvil, means to engage the pin and to apply a pulling force thereto; and said first, second and power means being so interrelated and constructed as to be manipulatable by an operator; whereby upon actuation of the power means, the pin is drawn through the member and the swaging anvil, and, by the reactive force exerted by the outer yoke through said anvil, the collar is swaged into the grooving on the pin and against said holed member.

3. A device adapted to set a two-piece fastener, comprising a grooved pin and a malleable collar to be swaged in the grooving on said pin, in a hole in a member behind an obstruction, said obstruction being spaced from the member and extending past the outwardly projected axis of the hole so as to prevent a straight axis fastener setting tool from being brought into axial alignment with said pin in said hole, said device comprising: an outer yoke, said yoke being elongated and having a longitudinal cross-section of a configuration such as to extend from an extremity in abutment with said hole around the obstruction to a point outside thereof and substantially in alignment with the projected axis of the hole; an inner yoke of similar longitudinal cross-section, said inner yoke fitting inside the outer yoke and being slideable for a predetermined distance longitudinally relative to said outer yoke, said inner yoke including a terminal portion disposable adjacent said outer yoke extremity; a casing defining a cylinder disposed with its axis pointed in substantially the same direction as the hole axis, said casing being adapted to hold said outer yoke in circumvention of said obstruction and with said yoke extremity in abutment with said holed member, said casing being fixedly secured to said outer yoke remotely from the said extremity; a piston reciprocable in said cylinder, extension means connecting said piston to the inner yoke; and a source of fluid under pressure, said source being connectible to said cylinder to push said piston in a direction away from said member, thereby to draw said inner yoke terminal portion away from said outer yoke extremity and holed member; said outer yoke being orificed at its said abutting extremity and a swaging anvil being inserted in said orifice; and said inner yoke including at its terminal portion adjacent said anvil and in register with the anvil, means to engage the pin and to apply a pulling force thereto, whereby upon actuation of the piston means by admitting fluid into said cylinder, the pin is drawn through the member and the swaging anvil, and by the reactive force exerted by the outer yoke through said anvil, the collar is swaged into the grooves on the pin and against said holed member.

4. A device adapted to set a two-piece fastener, comprising a grooved pin and a malleable collar to be swaged in the grooving on said pin, in a hole in a member behind an obstruction, said obstruction being spaced from the member and extending past the outwardly projected axis of the hole, so as to prevent a straight axis fastener setting tool from being brought into axial alignment with said pin in said hole, said device comprising: an outer yoke, said yoke being elongated and having a U-shaped longitudinal cross-section with one extremity disposable in abutment with the hole defining portion of said member, an inner yoke of similar configuration and longitudinal cross-section, said inner yoke fitting inside the outer yoke and being slideable for a predetermined distance longitudinally relative to and within said outer yoke said inner yoke having a terminal portion disposable adjacent said outer yoke extremity; first means for holding said outer yoke in circumvention of said obstruction and with its said extremity in abutment with said holed member, said means being fixedly secured to said outer yoke remotely from the last said extremity; second means reciprocable relative to said first means in the direction of the projected axis of the hole, said second means being fixedly secured to the inner yoke; and power means adapted, upon actuation, to slide said second means relative to the first means, thereby to draw said terminal portion of said inner yoke away from said outer yoke extremity and holed member; said outer yoke being orificed at its said abutting extremity and a swaging anvil being inserted in said orifice; and said inner yoke including at its terminal portion adjacent said anvil and in register with the anvil, means to engage the pin and to apply a pulling force thereto; whereby upon actuation of the power means, the pin is drawn through the member and the swaging anvil, and, by the reactive force exerted by the outer yoke through said anvil, the collar is swaged into the grooving on the pin and against said holed member.

5. A device adapted to set a two-piece fastener, comprising a grooved pin and a malleable collar to be swaged in the grooving on said pin, in a hole in a member behind an obstruction, said obstruction being spaced from the member and extending past the outwardly projected axis of the hole, so as to prevent a straight axis fastener setting tool from being brought into axial alignment with said pin in said hole, said device comprising: an outer yoke, said yoke being elongated and having a U-shaped longitudinal cross-section; with one extremity disposable in abutment with the hole defining portion of said member, an inner yoke of similar configuration and longitudinal cross-section, said inner yoke fitting inside the outer yoke and being slideable for a predetermined distance longitudinally relative to and within said outer yoke said inner yoke having a terminal portion disposable adjacent said outer yoke extremity; a casing defining a cylinder disposed with the axis pointed in substantially the same direction as the hole axis, said casing being adapted to hold said outer yoke in circumvention of said obstruction and with one yoke extremity in abutment with said holed member, said casing being fixedly secured to said outer yoke remotely from the last said extremity; a piston reciprocable in said cylinder, extension means connecting said piston to the inner yoke; and a source of fluid under pressure, said source being connectible to said cylinder to push said piston in a direction away from said member, thereby to draw said terminal portion of said inner yoke away from said outer yoke extremity and said holed member; said outer yoke being orificed at its said abutting extremity and a swaging anvil being inserted in said orifice; and said inner yoke including at its terminal portion adjacent said anvil and in register with the anvil, means to engage the pin and to apply a pulling force thereto, whereby upon actuation of the power means, the pin is drawn through the member and the swaging anvil, and, by the reactive force exerted by the outer yoke through said anvil, the collar is swaged in the grooving of the pin and against said holed member.

6. A device adapted to set a two-piece fastener, comprising a grooved pin and a malleable collar to be swaged in the grooving on said pin, in a hole in a member behind an obstruction, said obstruction being spaced from the member and extending past the outwardly projected axis of the hole, so as to prevent a straight axis fastener setting tool from being brought into axial alignment with said pin in said hole, said device comprising: an outer yoke being elongated and having a longitudinal cross-section of a configuration such as to extend from an extremity in abutment with said hole around the obstruction to a point outside thereof and substantially in alignment with the projected axis in the hole; an inner yoke of similar longitudinal cross-section, said inner yoke fitting inside the outer yoke and being slideable for a predetermined distance longitudinally relative to said outer yoke, said inner yoke including a terminal portion disposable adjacent said outer yoke extremity; first means for holding said outer yoke in circumvention of said obstruction and with its said extremity in abutment with said holed member, said means being fixedly secured to said outer yoke remotely from the said extremity; second means reciprocable relative to said first means in the direction of the projected axis of the hole, said second means being fixedly secured to the inner yoke; power means adapted, upon actuation, to slide said second means relative to the first means, thereby to draw said inner yoke terminal portion away from said outer yoke extremity and holed member; said outer yoke being orificed at its said abutting extremity and a swaging anvil being inserted in said orifice; and said inner yoke including at its terminal portion adjacent said anvil and in register with the anvil, means to engage the pin and to apply a pulling force thereto, whereby upon actuation of the power means, the pin is drawn through the member and the swaging anvil, and by the reactive force exerted by the outer yoke through said anvil, the collar is swaged in the grooving of the pin and against said holed member.

7. A tool adapted to apply a force in a predetermined direction with reference to the axis of an orifice in a member, in relation to which member an obstruction is disposed, spaced from said member and extending transversely through the projected axis of the orifice, but affording access to said orifice over at least one edge of said obstruction and via the space between same member and said orifice, said tool comprising: an elongated element, said element having a configuration such that when said element is disposed in proximity to said obstruction and said orifice, said element extends from a first point located on the side of said obstruction remote from said member, over said one edge of said obstruction and to a terminating extremity adjacent the entrance to said orifice, thereby to circumvent said obstruction, said terminating extremity being further of such size as to be reciprocable for a predetermined distance within the space between said member and said obstruction; and means connectible to said element at said first point, said means being adapted to hold said element in a selected alignment with the axis of said orifice and to reciprocate said element for the distance through which said terminating extremity is reciprocable in said space.

8. A tool adapted to apply a force in a predetermined direction with reference to the axis of an orifice in a member, in relation to which member an obstruction is disposed, spaced from said member and extending transversely through the projected axis of the orifice, but affording access to said orifice over at least one edge of said obstruction and via the space between same member and said orifice, said tool comprising: an elongated element, said element having a configuration such that when said element is disposed in proximity to said obstruction and said orifice, said element extends from a first point located on the side of said obstruction remote from said member and substantially in the projected axis of said orifice, over said one edge of said obstruction and to a terminating extremity adjacent the entrance to said orifice, thereby to circumvent said obstruction, said terminating extremity being further of such size as to be reciprocable for a predetermined distance within the space between said member and said obstruction; and means connectible to said element at said first point, said means being adapted to hold said element in a selected alignment with the axis of said orifice and to reciprocate said element for the distance through which said terminating extremity is reciprocable in said space.

No references cited.